(12) United States Patent
Sakuma

(10) Patent No.: US 11,505,136 B2
(45) Date of Patent: Nov. 22, 2022

(54) AUTOMOBILE INTERIOR TRIM

(71) Applicant: KASAI KOGYO CO., LTD., Kanagawa (JP)

(72) Inventor: Tomonari Sakuma, Sagamihara (JP)

(73) Assignee: KASAI KOGYO CO., LTD., Kanagawa (JP)

( * ) Notice: Subject to any disclaimer, the term of this patent is extended or adjusted under 35 U.S.C. 154(b) by 428 days.

(21) Appl. No.: 16/756,005

(22) PCT Filed: May 29, 2018

(86) PCT No.: PCT/JP2018/020482
§ 371 (c)(1),
(2) Date: Apr. 14, 2020

(87) PCT Pub. No.: WO2019/229831
PCT Pub. Date: Dec. 5, 2019

(65) Prior Publication Data
US 2020/0238924 A1    Jul. 30, 2020

(51) Int. Cl.
| | | |
|---|---|---|
| *B32B 3/00* | (2006.01) | |
| *B60R 13/02* | (2006.01) | |
| *B32B 3/30* | (2006.01) | |
| *B32B 27/06* | (2006.01) | |
| *B32B 3/08* | (2006.01) | |
| *B60R 21/213* | (2011.01) | |
| *B60R 21/2165* | (2011.01) | |

(52) U.S. Cl.
CPC ............ *B60R 13/025* (2013.01); *B32B 3/085* (2013.01); *B32B 3/30* (2013.01); *B32B 27/06* (2013.01); *B32B 2605/003* (2013.01); *B60R 21/213* (2013.01); *B60R 21/2165* (2013.01)

(58) Field of Classification Search
CPC .......................... B60R 21/213; B60R 21/2165
See application file for complete search history.

(56) References Cited

FOREIGN PATENT DOCUMENTS

| | | |
|---|---|---|
| JP | H09-076794 A | 3/1997 |
| JP | 2010-173386 A | 8/2010 |
| JP | 2010-285060 A | 12/2010 |
| JP | 2012-153196 A | 8/2012 |

OTHER PUBLICATIONS

International Search Report for International Application No. PCT/JP2018/020482 dated Aug. 7, 2018, Japan, 1 page.

*Primary Examiner* — Elizabeth E Mulvaney
(74) *Attorney, Agent, or Firm* — United IP Counselors, LLC

(57) ABSTRACT

An automobile interior trim includes: a resin core member formed to have a predetermined shape; a surface member bonded to a front surface of the resin core member; a plurality of reinforcement ribs provided at a back surface of the resin core member in a width direction of the resin core member; and a recess formed at an upper end surface of each of the reinforcement ribs as means for setting a terminal part of the resin core member as a base point of rupture so that, when a side airbag deploys on the back surface side of the resin core member, the terminal part of the resin core member ruptures by force of the deployment. A slit is formed at the terminal part of the surface member adjacent to the base point of the rupture of the resin core member.

5 Claims, 14 Drawing Sheets

AUTOMOBILE INTERIOR TRIM

CROSS-REFERENCE TO RELATED APPLICATIONS

This application is a National Stage Entry application of PCT International Application No. PCT/JP2018/020482, filed on May 29, 2018, the entire contents of which are hereby incorporated by reference.

BACKGROUND

1. Technical Field

The present invention relates to an automobile interior trim mounted on the inner surface of a front pillar or a rear pillar which is well-known as a vehicle body frame component for an automobile. Particularly, the present invention is suitable for realizing stable deployment of a side airbag.

2. Description of the Background

Conventionally, a pillar garnish as an automobile interior trim is mounted on the inner surface (the surface on the cabin side) of a front pillar or a rear pillar which is well-known as a vehicle body frame component for an automobile. Furthermore, a side rail is known as a vehicle body frame component coupling the front and rear pillar garnishes around the ceiling of an automobile. On the inner surface of the side rail, a side rail garnish is mounted as an automobile interior trim.

On the back surface side of the garnish, a side airbag may be provided as being folded or rolled up in a deployable manner. In this case, as means for generating gas for deploying the side airbag by inflation, an inflator is provided on the back surface side of the rear pillar garnish.

As means for pr river's temporal from any shock, for example as disclosed in Japanese Unexamined Patent Application Publication No. 2010-173386 (hereinafter referred to as "Patent Literature 1"), the front portion of a side airbag (3a) is extended to be in close proximity to the back surface of the upper part of a front pillar garnish (4a). A pillar garnish (4A) of Patent Literature 1 includes a resin core member (5). At the back surface of an upper part of the resin core member (5), a recess (6a) to serve as the base point of rupture is provided as means for setting rupture to occur at the upper part of the front pillar garnish (4A) by the deploying force of the side airbag.

Meanwhile, in a conventional automobile interior trim such as the pillar garnish (4A) in Patent Literature 1, a surface member is bonded to the front surface of the resin core member. Here, the surface member does not have any structure that may serve as the base point of rupture such as the recess (6a), that is, no base point of rupture exists. Accordingly, the conventional automobile interior trim does not easily rupture by the deploying force of the side airbag, and suffers the problem that the side airbag cannot be stably deployed.

Note that, the reference characters in parentheses are those used in Patent Literature 1.

BRIEF SUMMARY

The present invention has been made in order to solve the problem, and an object thereof is to provide an automobile interior trim which is suitable for realizing stable deployment of a side airbag.

In order to achieve the object, the present invention provides an automobile interior trim including: a resin core member formed to have a predetermined shape; a surface member bonded to a front surface of the resin core member; a plurality of reinforcement s provided at a back surface of the resin core member in a width direction of the resin core member; and a recess formed at an upper end surface of each of the reinforcement ribs as means for setting a terminal part of the resin core member as a base point of rupture so that, when a side airbag deploys on the back surface side of the resin core member, the terminal part of the resin core member ruptures by force of the deployment. A slit is formed at the terminal part of the surface member adjacent to the base point of the rupture of the resin core member.

In the present invention, the slit may be in a linear manner in a range from its slit start point to its slit end point.

In the present invention, the slit may include, in a range from the slit start point to the slit end point, a slit-widened part with a wider width and a slit-narrowed part with a narrower width.

In the present invention, the slit-widened part may be widened in a tapered manner from the slit end point toward the slit start point.

In the present invention, the slit-widened part may be arc-shaped.

In the present invention, as described above, as the specific structure of the automobile interior trim, the slit is formed at the terminal part of the surface member adjacent to the base point of rupture of the resin core member. Therefore, when the terminal part of the resin core member ruptures by the force of the side airbag's deploying, the surface member is torn from the slit as the base point following the rupture. Hence, contrary to the conventional technique, the surface member will not inhibit the rupture of the terminal part of the resin core member when the side airbag deploys, and the automobile interior trim which is suitable for realizing stable deployment of a side airbag is provided.

DETAILED DESCRIPTION

In the following, with reference to the accompanying drawings, a detailed description will be given of a best mode for carrying out the present invention.

Figure 1:
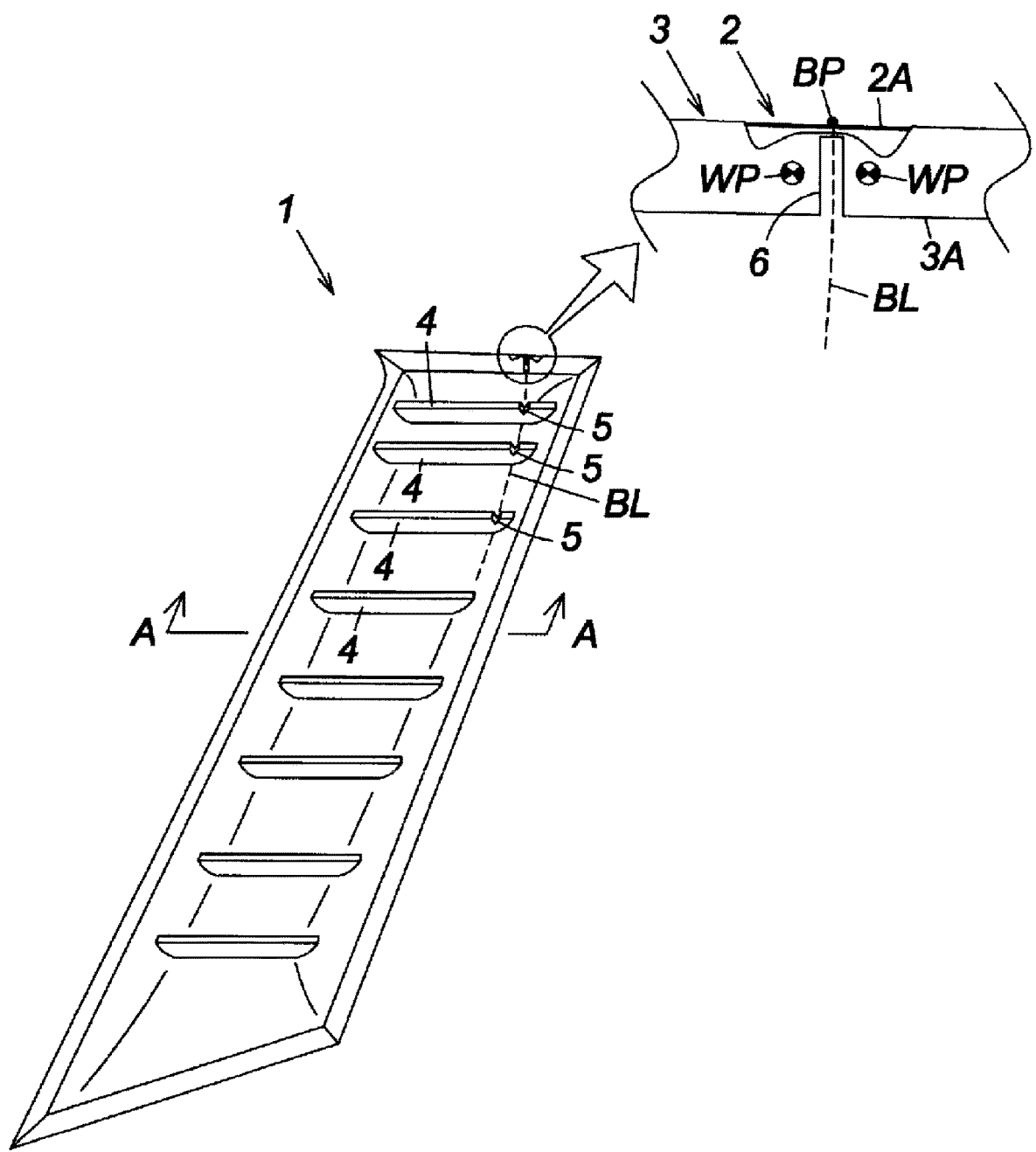
FIG. 1 is a schematic perspective view of an automobile interior trim (a front pillar garnish) according to one embodiment of the present invention.
Figure 2:
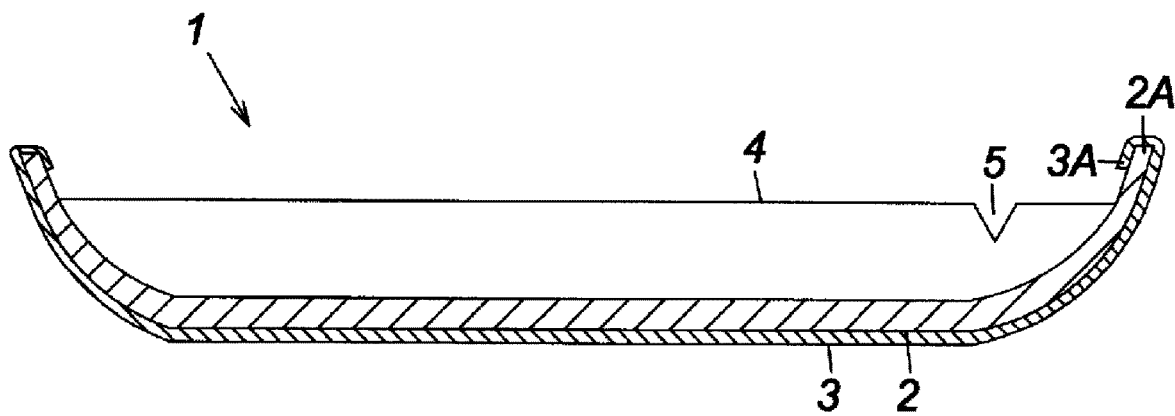
FIG. 2 is a cross-sectional view taken on arrow A in FIG. 1.
Figure 3:
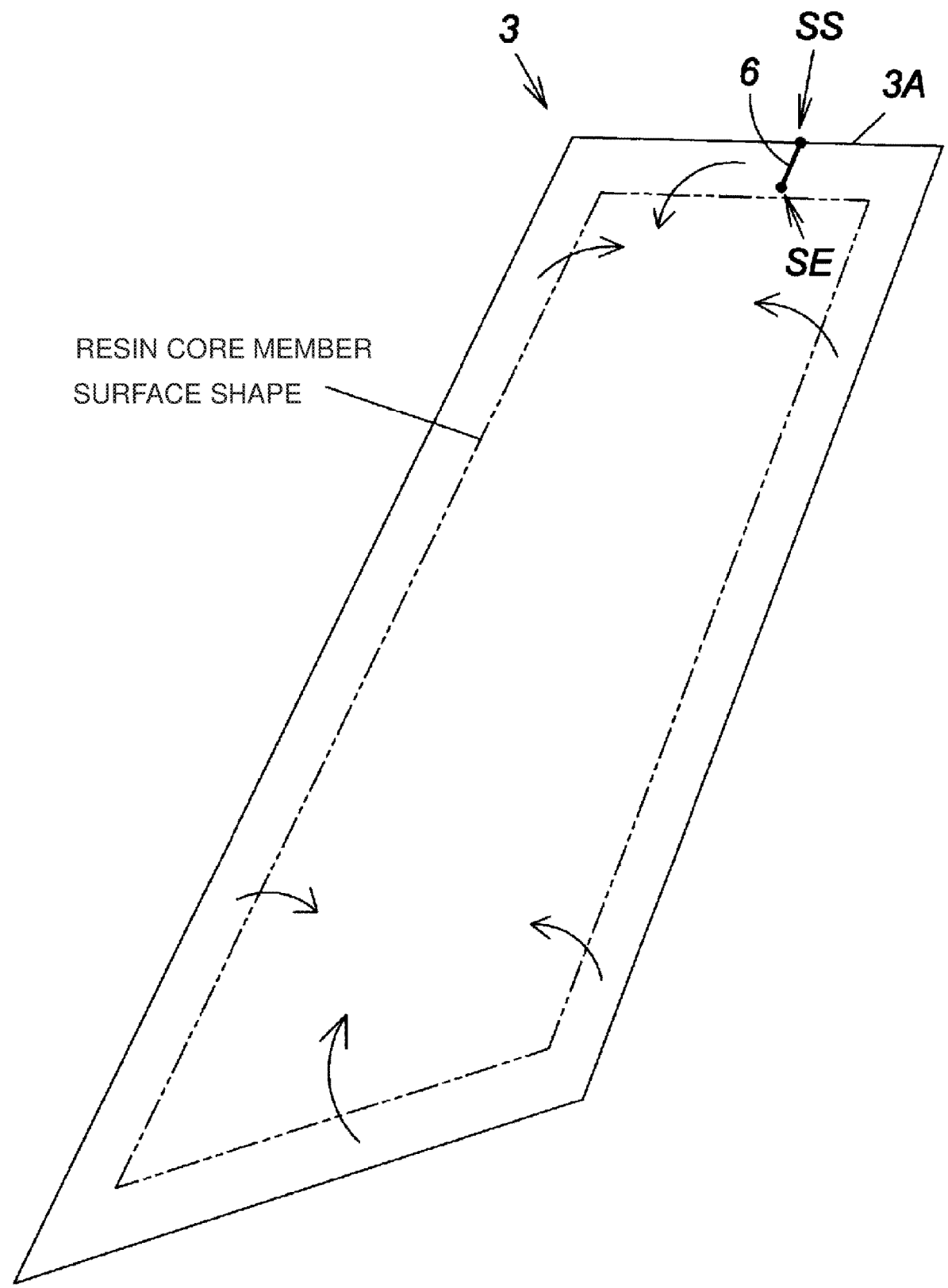
FIG. 3 is a rear view of a surface member of the automobile interior trim in FIG. 1.
Figure 4:
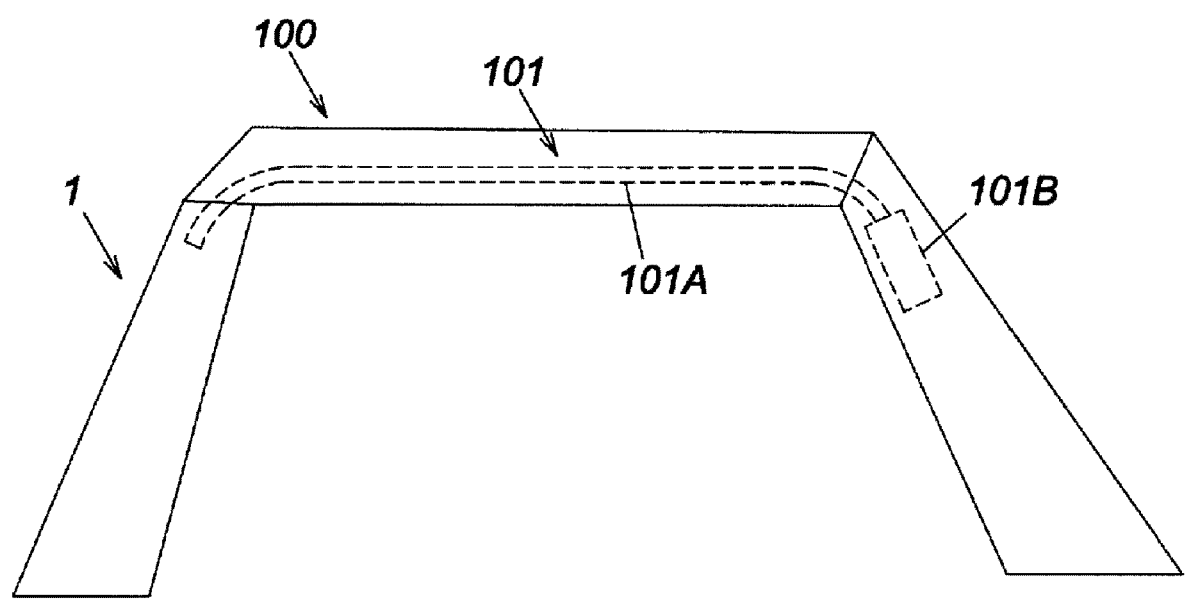
FIG. 4 is an explanatory illustration of the automobile interior trim in FIG. 1 being mounted on a front pillar.

FIG. 1 is a schematic perspective rear view of an automobile interior trim (a front pillar garnish) to which the present invention is applied. FIG. 2 is a cross-sectional view taken on arrow A in FIG. 1. FIG. 3 is a rear view of a surface member (in the state before bonding) of the automobile interior trim in FIG. 1. FIG. 4 is an explanatory illustration of the automobile interior trim in FIG. 1 mounted on a front pillar.

With reference to FIGS. 1 and 2, the automobile interior trim 1 according to the present embodiment is used as a front pillar garnish mounted on the inner surface of a front pillar (not shown) which is a well-known vehicle body frame component for an automobile. As its basic members, the automobile interior trim 1 includes a resin core member 2 formed to have a predetermined shape corresponding to the shape of the front pillar, and a surface member 3 bonded to the surface of the resin core member 2. In this structure, a terminal part 3A of the bonded surface member 3 is folded onto the back surface of the resin core member 2 as in FIG. 2, so as not to appear on the front surface side.

The resin core member 2 and the surface member 3 are both formed of resin. Therefore, as to the scheme of bonding the surface member 3 to the resin core member 2, in the automobile interior trim 1 according to the present embodiment, the surface member 3 and the resin core member 2 are welded in a spot manner at a plurality of portions by melting achieved by ultrasound or the like.

On the back surface of the resin core member 2, not-shown fixing means such as a clip is provided. The fixing means fixes the automobile interior trim 1 according to the present embodiment to the inner surface of the front pillar.

With reference to FIG. 4, the automobile interior trim 1 (a front garnish) according to the present embodiment is coupled to other automobile interior trim (specifically, a side rail garnish 100 which extends from substantially the front ceiling part to substantially the rear ceiling part in the automobile), as being mounted on the inner surface of the front pillar.

On the back surface side of the side rail garnish 100, a well-known airbag apparatus 101 is provided. The airbag apparatus 101 includes a side airbag 101A as being folded, and an inflator 101B for generating gas for deploying the side airbag 101A by inflation.

As means for protecting the driver's temporal from any shock, as shown in FIG. 4, the front portion of the side airbag 101A is extended to substantially the back surface of the upper part of the automobile interior trim 1 (the front pillar garnish) according to the present embodiment. Accordingly, the side airbag 101A deploys also on the back surface side of the automobile interior trim 1 according to the present embodiment (specifically, the back surface side of the resin core member 2).

As means for improving the strength of the whole automobile interior trim 1, as shown in FIGS. 1 and 2, in the automobile interior trim 1 according to the present embodiment, a plurality of reinforcement ribs 4 are provided at the back surface of the resin core member 2 in the width direction of the resin core member 2. The number, shape, disposition interval and the like of the reinforcement ribs 4 of this type can be changed as appropriate as necessary.

In the automobile interior trim 1 according to the present embodiment, a recess 5 is formed at the upper end surface of each of the reinforcement ribs 4, as means for setting the terminal part 2A of the resin core member 2 as a base point BP of rupture so that, when the side airbag 101A deploys on the back surface side of the resin core member 2, the terminal part 2A of the resin core member 2 ruptures by force of the deployment.

In order to allow the resin core member 2 to rupture along a designed rupture plan BL represented by a broken line in the drawings from the base point BP of rupture, in the automobile interior trim 1 according to the present embodiment, the recess 5 is provided for each of the successive plurality of reinforcement ribs 4. Here, the present invention is not limited thereto. In what number the recess 5 is to be provided for which reinforcement rib 4 can be changed as appropriate as necessary in view of the rupture plan line BL.

As means for preventing the surface member 3 from inhibiting the rupture of terminal part 2A of the resin core member 2 when the side airbag 101A deploys, in the automobile interior trim 1 according to the present embodiment, a slit 6 is formed at the terminal part 3A of the surface member 3 adjacent to the base point BP of rupture of the resin core member 2 (see FIG. 3). That is, when the resin core member 2 ruptures from the base point BP by the deploying force of the side airbag, the surface member 2 is designed to be broken or torn from the slit 6 as the base point following the rupture.

As means for preventing the right and left sides of the slit 6 from curling up, in the automobile interior trim 1 according to the present embodiment, when the surface member 3 and the resin care member 2 are welded in a spot-like manner at a plurality of portions as described above, the right and left sides of the slit 6 are also welded spot-like. The welding points are represented by reference character WP in the drawings.

<Details of Slit 6>

With reference to FIG. 3, the slit 6 shown in FIG. 1 is in a linear manner in the range from its slit start point SS to its slit end point SE. The slit 6 of this mode (hereinafter referred to as "the basic mode") can be set so that the points of welding between the right and left sides of the slit 6 and the resin core member 2 (hereinafter referred to as "the welding points WP on right and left sides of the slit") are the closest to the rupture plan line BL of the resin core member 2. Accordingly, when the resin core member 2 ruptures along the rupture plan line BL, the surface member 3 quickly is torn from the slit 6 as the base point. That is, the tear reaction of the surface member 2 (hereinafter referred to as "the tear response") to the rupture of the resin core member 2 is advantageously excellent. On the other hand, in the slit 6 of the basic mode, the right and left sides of the slit 6 are in close proximity to each other over the entire length of the slit 6. Accordingly, in welding the right and left sides of the slit 6, the operator may fail to smoothly carry out the welding work, that is, the operator may not easily visually recognize the slit 6 and have trouble in finding the slit 6.

Figure 5:
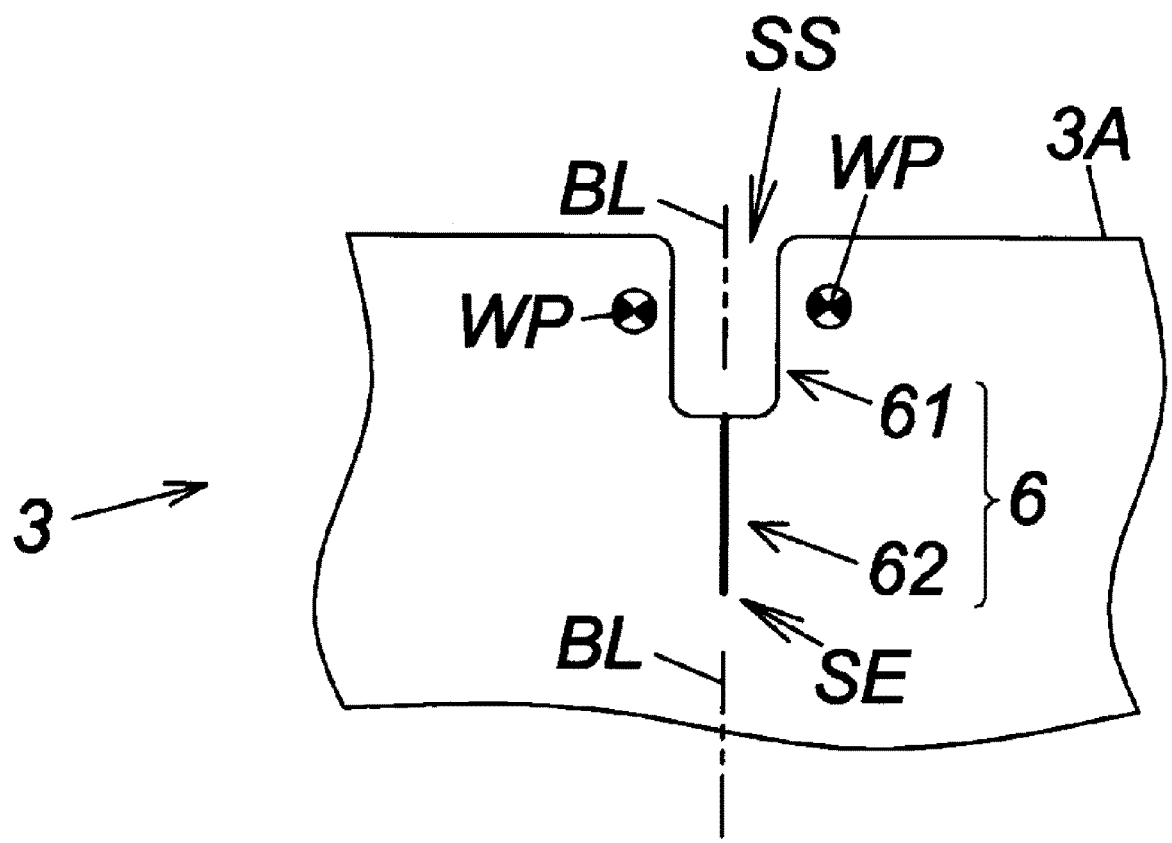
FIG. 5 is an explanatory illustration of a modification (in the state before bonding) of a slit FIG. 1 (see FIG. 3).
Figure 6:
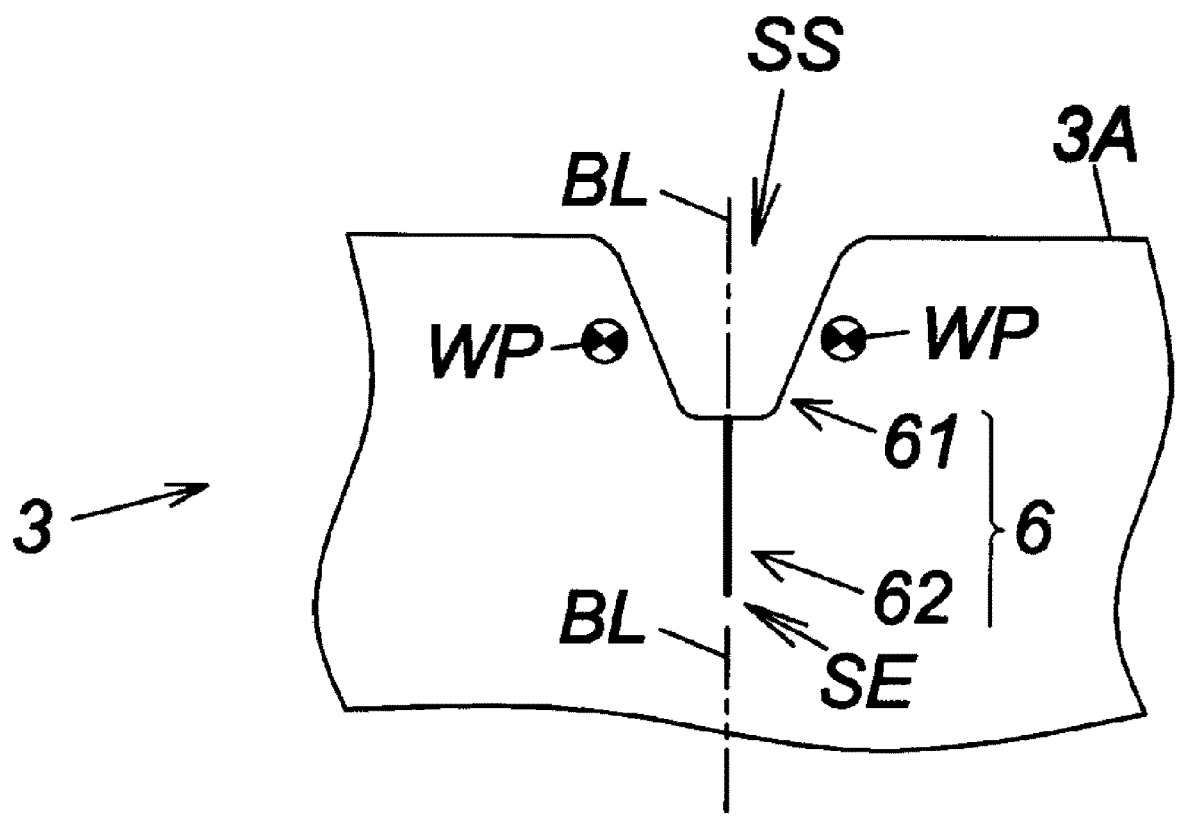
FIG. 6 is an explanatory illustration of a first variation (in the state before bonding) of the slit in FIG. 5.
Figure 7:
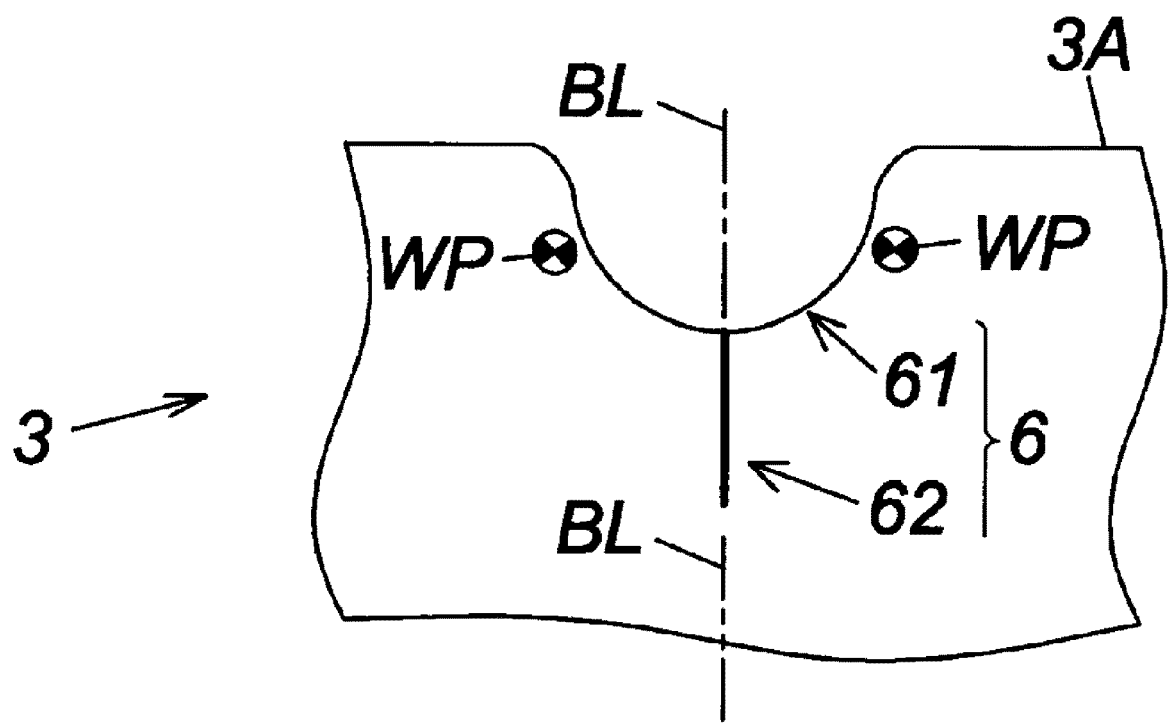
FIG. 7 is an explanatory illustration of a second variation (in the state before bonding) of the slit in FIG. 5.
Figure 8:
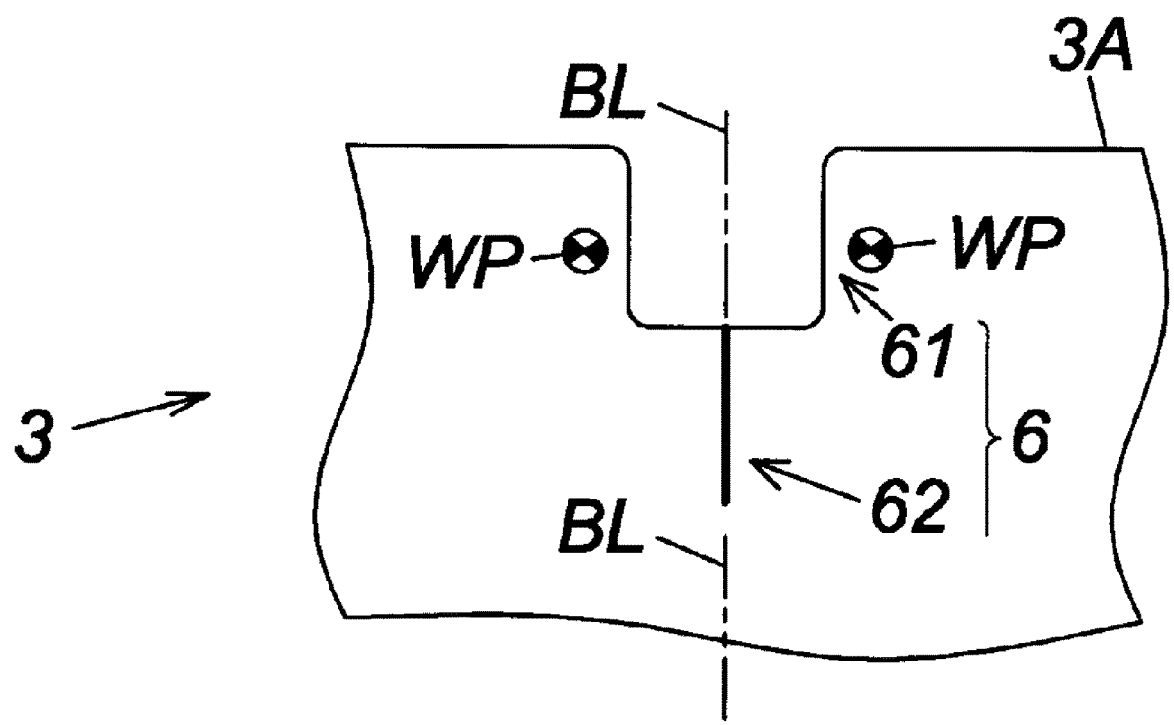
FIG. 8 is an explanatory illustration of a third variation (in the state before bonding) of the slit in FIG. 5.

FIG. 5 is an explanatory illustration of a modification of the slit in FIG. 1 (see FIG. 3). FIG. 6 is an explanatory illustration of a first variation of the slit in FIG. 5. FIG. 7 is an explanatory illustration of a second variation of the slit in FIG. 5. FIG. 8 is an explanatory illustration of a third variation of the slit in FIG. 5.

The slit 6 in FIG. 5 has its width partially widened from around the slit start point SS by a range of a predetermined length. That is, the slit 6 of this mode (hereinafter referred to as "the modification") includes, in the range from the slit start point SS to the slit end point SE, a slit-widened part 61 with a wider width and a slit-narrowed part 62 with a narrower width. With the slit 6 of the modification, the operator can more easily visually recognize the slit-widened part 61 in welding the right and left sides of the slit 6. Accordingly, it is easier for the operator to find the slit 6 as compared to the slit 6 of the basic mode described above (see FIGS. 1 and 3), and the operator can smoothly carry out the welding work. Since the welding points WP of the right and left sides of the slit 6 can be set at positions relatively near to the rupture plan line BL of the resin core member 2, the tear response of the surface member 2 is also excellent.

As the first variation of the slit 6 in FIG. 5, the slit 6 in FIG. 6 has its slit-widened part 61 widened in a tapered manner from the slit end point SE toward the slit start point SS. This allows the slit-widened part 61 to be visually recognizable and facilitates the operator's finding the slit 6.

As the second variation of the slit 6 in FIG. 5, the slit 6 in FIG. 7 has its slit-widened part 61 arc-shaped. Similarly to the above-described first variation, the second variation further facilitates the operator's finding the slit 6. With the second variation also, since the welding points WP on right and left sides of the slit can be set at positions relatively near to the rupture plan line BL of the resin core member 2, the tear response of the surface member 2 is also excellent.

As the third variation of the slit 6 in FIG. 5, the slit 6 in FIG. 8 has its slit-widened part 61 further widened. The third variation is more advantageous than the slit 6 in FIG. 5 in that the operator's finding the slit 6 is further facilitated. On the other hand, in the third variation, since the welding points WP on right and left sides of the slit are positioned relatively far from the rupture plan line BL of the resin core member 2, the tear response of the surface member 2 tends to be reduced.

Figure 9:
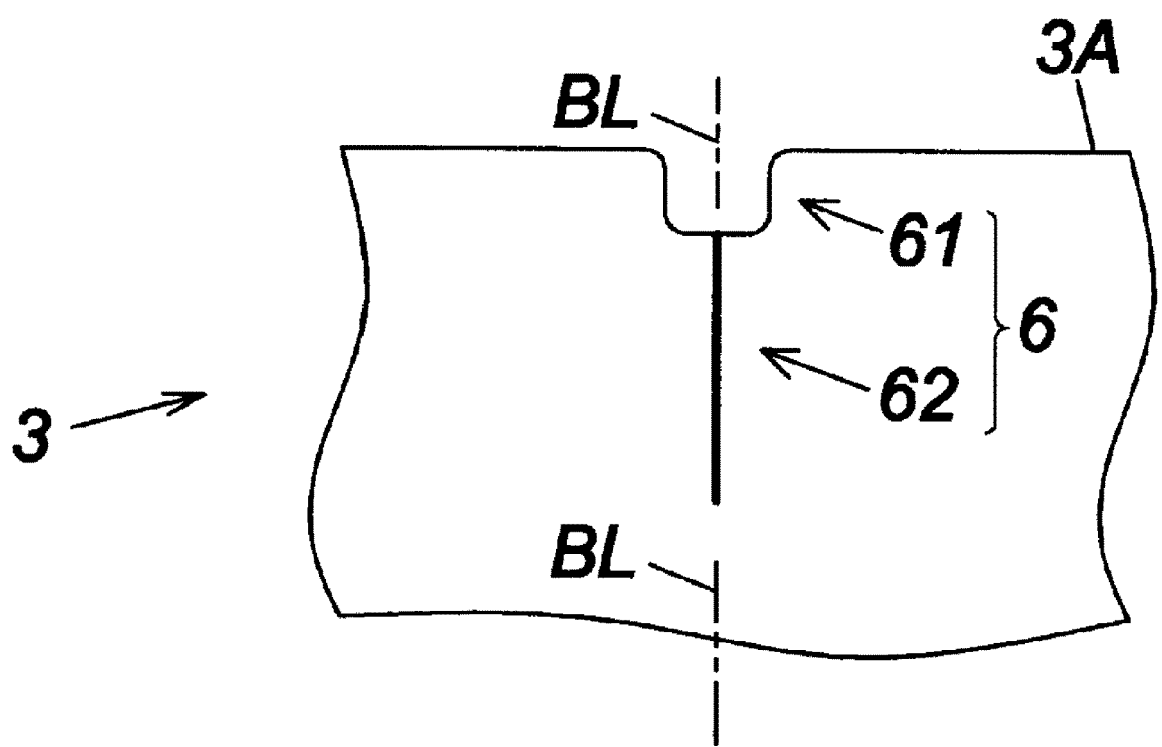
FIG. 9 is an explanatory illustration of a variation the state before bonding) the slit in FIG. 5.
Figure 10:
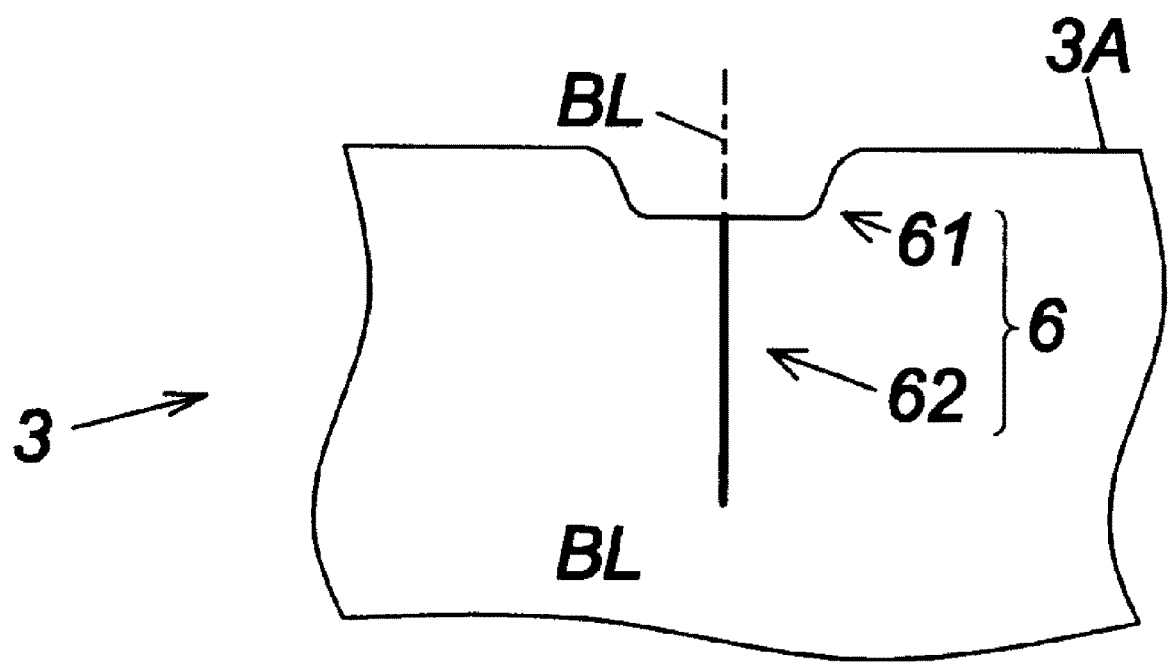
FIG. 10 is an explanatory illustration of a variation (in the state before bonding) of the slit in FIG. 6.
Figure 11:
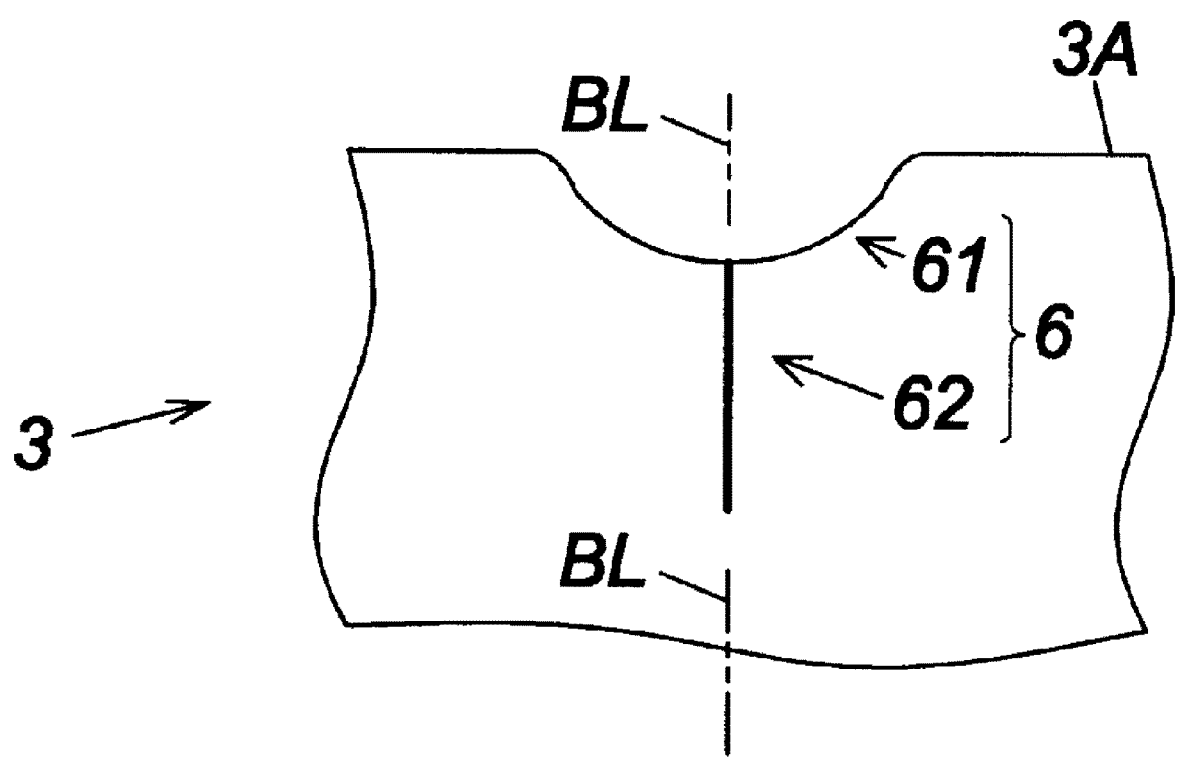
FIG. 11 is an explanatory illustration of a variation (in the state before bonding) the slit in FIG. 7.
Figure 12:
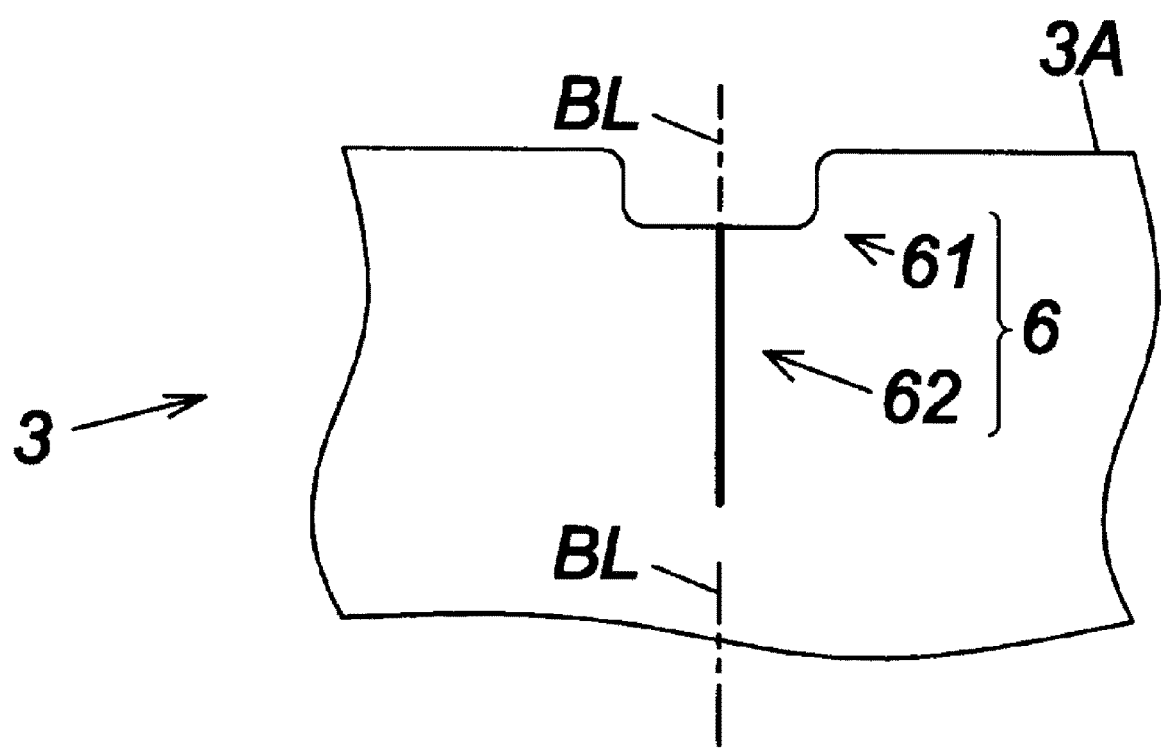
FIG. 12 is an explanatory illustration of a variation state before bonding) the slit in FIG. 8.

FIG. 9 is a variation of the slit in FIG. 5. FIG. 10 is a variation of the slit in FIG. 6. FIG. 11 is a variation of the slit 6 in FIG. 7. FIG. 12 is a variation of the slit 6 in FIG. 8.

The slits 6 in FIGS. 5 to 8 employ a substantially even ratio in length, that is, a ratio of 1:1 between the slit-widened part 61 and the slit-narrowed part 62. Here, in the slits 6 of the variation in FIGS. 9 to 12, the slit-widened part 61 is set to be smaller in length than the slit-narrowed part 62, for example at a ratio of 1:3. In this case, while the tear response of the surface member 2 relatively improves, the finding the slit 6 becomes less easier. Note that, the slits 6 in FIGS. 5 to 8 and the slits 6 of the variations in FIGS. 9 to 12 are different from each other just in the ratio and identical to each other in the rest of the structure. Therefore, a detailed description thereof is omitted.

Figure 13:
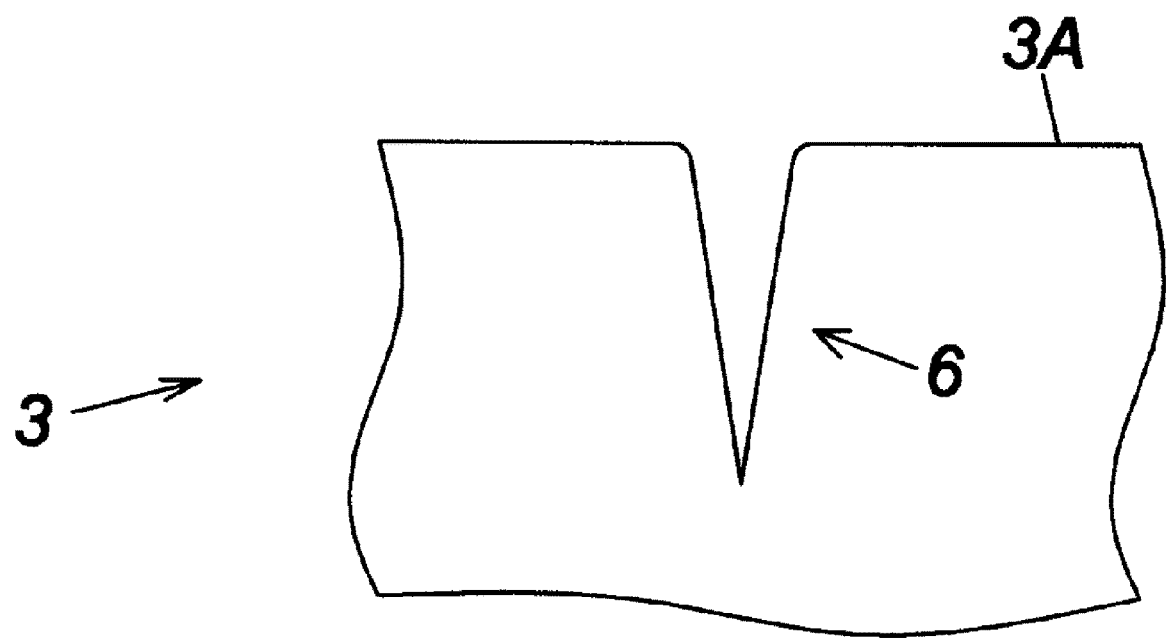
FIG. 13 is an explanatory illustration of a fourth variation the state before bonding) of the slit in FIG. 1 (see FIG. 3).
Figure 14:
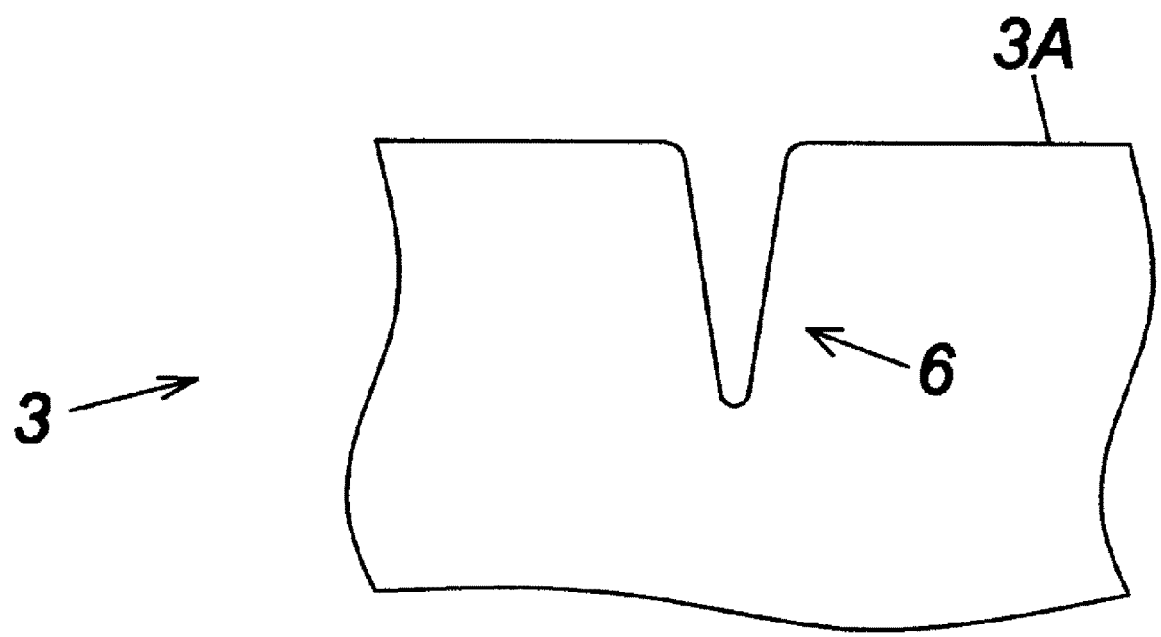
FIG. 14 is an explanatory illustration of a fifth variation (in the state before bonding) of the slit in FIG. 1 (see FIG. 3).

FIG. 13 is an explanatory illustration of a fourth variation of the slit in FIG. 1 (see FIG. 3). FIG. 14 is an explanatory illustration of a fifth variation of the slit in FIG. 1 (see FIG. 3).

While the slit 6 of the basic mode in FIG. 1 may be V-shaped as shown in FIG. 13 for example, such a V-shaped slit 6 is not easily punched out because of the sharp tip of the V shape. This may be addressed by forming the tip of the V shape as an arc shape as in the slit 6 in FIG. 14. However, the arc shape is not preferable as the base point the tear in the surface member 2.

The present invention is not limited to the foregoing, and various changes may be made by a skilled in the art within the technical idea of the present invention.

For example, the present invention s applicable to a rear pillar garnish which is a well-known automobile interior trim.

REFERENCE SIGNS LIST

1 automobile interior trim
2 resin core member
2A terminal part of resin core member
3 surface member
3A terminal part of surface member
4 reinforcement rib
5 recess
6 slit
61 slit-widened part
62 slit-narrowed part
100 side rail garnish
101 airbag apparatus
101A side airbag
101B inflator
BL rupture plan line
BP base point of rupture of resin core member
SS slit start point
SE slit end point

The invention claimed is:

1. An automobile interior trim comprising:
a resin core member formed to have a predetermined shape;
a surface member bonded to a front surface of the resin core member;
a plurality of reinforcement ribs provided at a back surface of the resin core member in a width direction of the resin core member; and
a recess formed at an upper end surface of each of the reinforcement ribs as means for setting a terminal part of the resin core member as a base point of rupture so that, when a side airbag deploys on the back surface side of the resin core member, the terminal part of the resin core member ruptures by force of the deployment, wherein
a slit is formed at the terminal part of the surface member adjacent to the base point of the rupture of the resin core member.

2. The automobile interior trim according to claim 1, wherein the slit is in a linear manner in a range from its slit start point to its slit end point.

3. The automobile interior trim according to claim 1, wherein the slit includes, in a range from its slit start point to its slit end point, a slit-widened part with a wider width and a slit-narrowed part with a narrower width.

4. The automobile interior trim according to claim 3, wherein the slit-widened part is widened in a tapered manner from the slit end point toward the slit start point.

5. The automobile interior trim according to claim 3, wherein the slit-widened part is arc-shaped.

\* \* \* \* \*